Figure 1:
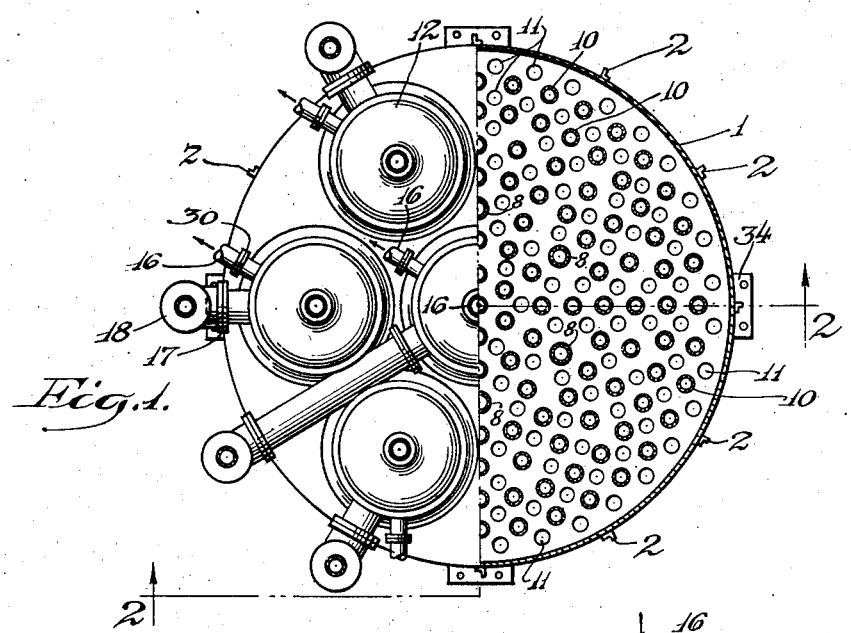

Oct. 22, 1946.  L. A. MEKLER  2,409,780

REACTOR

Filed Feb. 11, 1942

Inventor:
Lev A. Mekler
By Lee J. Gary
Attorney

Patented Oct. 22, 1946

2,409,780

UNITED STATES PATENT OFFICE 2,409,780

REACTOR

Lev A. Mekler, Chicago, Ill., assignor to Universal Oil Products Company, Chicago, Ill., a corporation of Delaware Application February 11, 1942, Serial No. 430,507

4 Claims. (Cl. 23—288)

This invention relates to an improved form of apparatus in which fluids may be intimately contacted with solid granular materials. The features of the invention make it especially applicable to catalytic processes for the conversion of hydrocarbons such as in the dehydrogenation of butanes and/or butenes to butadienes and especially in such processes wherein the solid contact material is maintained in a highly turbulent fluid-like state.

In designing equipment for this class of service the conditions of operation must be considered. In the dehydrogenation process above mentioned these conditions include relatively high operating temperatures of the order of approximately 800° F. to 1300° F. and low operating pressures ranging for example from substantially atmospheric to low sub-atmospheric pressure, corresponding say to about 100 mm. of mercury. It is also important in this particular process that the reaction products be quickly cooled after the desired reaction has been accomplished, in order to prevent undesired secondary and side reactions which would normally occur at the high temperature of these products.

Another item of importance is the substantially uniform distribution of the fluid reactants and finely divided solid material throughout the reaction zone during the conversion period to insure intimate and uniform contacting therebetween.

A suitable reactor for conducting the above mentioned process must be capable of satisfying all the above conditions and in addition present a low resistance to the passage of fluids therethrough in order to minimize pressure drop through the reaction zone and provide for low pressure operation throughout the reaction zone.

The features of the invention provide a reactor in which all the above mentioned conditions are satisfied to a high degree. The apparatus is designed to withstand high temperature and low internal pressure. It provides for uniform distribution of the fluid reactants and contact material throughout the cross-sectional area of the reacting zone and for intimate contact between the reactants and the catalyst or contact material. It also permits operation in such a manner that the finely divided solid material is maintained in highly turbulent fluid-like state.

The distribution means provided in the invention are also designed to serve a structural function and prevent collapse of the shell of the vessel, thus permitting relatively light weight construction of the latter.

In its preferred form the invention also provides a combined cooling and separation zone immediately adjacent the exit point of the reaction products from the conversion zone to prevent undesired secondary and side reactions and to separate entrained particles of the finely divided solid material from the outgoing fluid reaction products.

Another feature of the invention resides in the provisions for maintaining a relatively shallow dense lower phase in a bed of finely divided material. This makes it possible to operate the above mentioned process with low pressure drop through the bed.

In order to more fully explain and illustrate the features and advantages of the invention, reference is made to the accompanying diagrammatic drawing and the following description thereof.

In the drawing Fig. 1 is a plan view, shown partially in section, of one specific form of the reactor provided.

Figure 2:
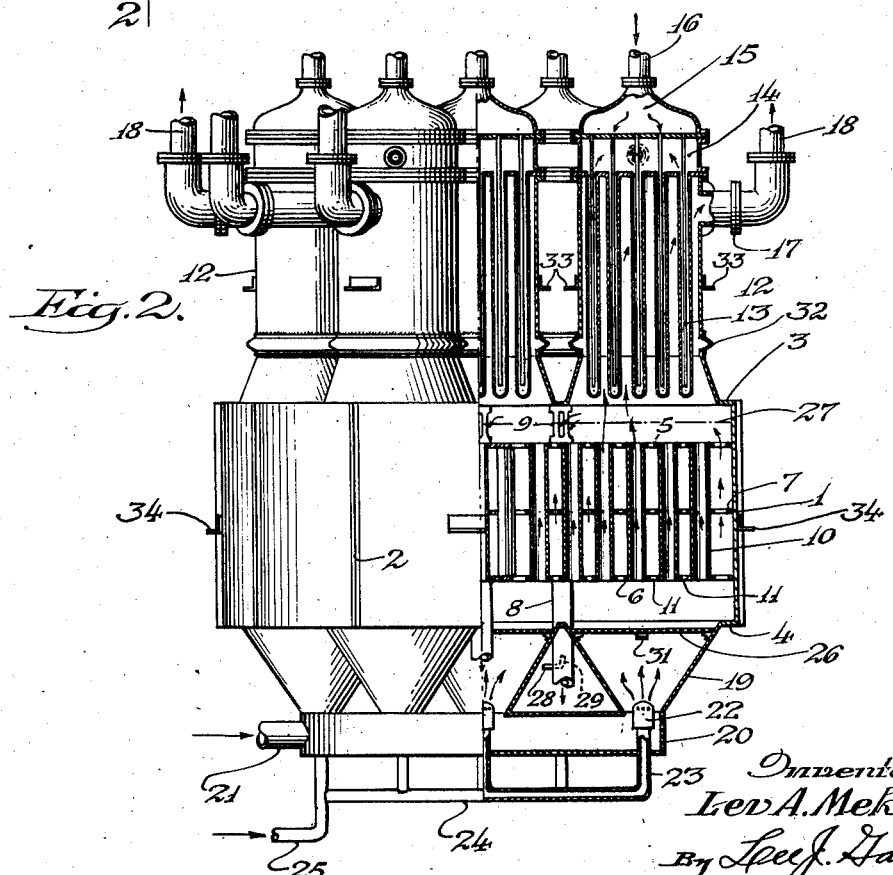

Fig. 2 is an elevational view of the same apparatus illustrated in Fig. 1 taken along line 2—2 in Fig. 1.

Referring now to the drawing, the reactor is made up of a short cylindrical outer shell 1 which, in the case here illustrated, has longitudinal reinforcing ribs 2 secured thereto, by welding or other suitable means, at spaced points about its periphery. The upper and lower ends of shell 1 are provided with relatively flat heads 3 and 4 respectively. Tube sheets 5 and 6 extending transversely across the shell and secured thereto are spaced from heads 3 and 4 and from each other and an intermediate tube sheet 7 is disposed between sheets 5 and 6. In order to prevent the collapse of heads 3 and 4 from external pressure a plurality of tubular members 8 are disposed longitudinally within the reactor and extend from head 3, to which they are welded or otherwise suitably secured to and through head 4, to which they are likewise secured. Adjacent their upper closed ends the tubes 8 are provided with slotted ports 9, the purpose of which will be hereinafter explained. The tubular members 8 in addition to being fastened to the heads 3 and 4 are also attached to the intermediate tube sheet 7 but preferably not to the tube sheets 5 and 6. Extending between the tube sheets 5 and 6 and attached thereto by suitable means, such as welding, roling or the like, but preferably not to the intermediate tube sheet 7, are a plurality of shorter tubular members 10. Tubes 10 serve to reinforce or stay tube sheets 5 and 6 and thus assist in preventing collapse of cylindrical shell of the reactor. The tubes 8 and 10 are preferably fastened to only alternate tube sheets 5, 6 and 7 in order to prevent the accumulation of stresses in any one member. The tube sheets 5, 6 and 7 are provided with a plurality of communication ports 11 disposed intermediate the several tubes thereby providing additional reactor space between said tubes, in which the desired contacting may take place.

The upper head 3 is provided with a plurality of communication ports to which are attached an equal number of heat exchangers, each of which comprises a shell 12. Within each shell 12 are disposed a plurality of bayonet type cooling tubes 13 through which suitable convective fluids may be passed. However it is entirely within the scope and spirit of the invention to utilize other conventional types of heat exchangers when desired. The outer members of said tubes 13 communicate with a header 14 and the inner members are in communication with header 15 to which a suitable convective fluid is supplied through conduit 16. The header 14 is provided with a flanged opening 30 communicating with conduit 16 and which serves to direct convective fluid from the heat exchanger. It is entirely within the scope of the invention that the flow of convective fluid through the cooling tubes may be the reverse of that shown by the arrows and above described. The shell of each heat exchanger is provided adjacent its upper end with the flanged outlet connection 17 to which conduits 18 are attached and which provides means for directing fluid conversion products from the reactor and heat exchangers to suitable separation and recovery equipment not pertinent to the present invention and therefore not illustrated.

The lower head 4 of the reactor is provided with a plurality of relatively large ports to which are attached a like number of cone-shaped members 19. The lower ends of these members communicate with a distributing chamber 20 or, when desired, suitable pipe manifolds may be substituted for the latter. Conduit 21 communicates with distribution chamber 20 and provides means for introducing the desired contacting material to the reactor. Disposed adjacent the lower end of each of the cone-shaped members 19 is a distributing nozzle 22 through which fluid reactants are directed upwardly into the reaction zone at the same time picking up a portion of the solid granular contact material from the distribution chamber 20. These nozzles communicate by means of conduits 23 with a manifold 24 which in turn communicates with conduit 25 to provide means for introducing fluid reactants into the reactor. Adjacent the upper end of each cone-shaped member 19 is a perforate plate 26, supported on suitable lugs 31, and serving as distributing means for the commingled fluid reactants and finely divided solid materials flowing into the main part of the reactor.

The upward flowing stream of fluid reactants, during its passage through the main body of the reactor, has an upward velocity which only partly offsets the effect of gravity upon the solid particles so that a hindered settling effect is obtained which results in a relatively dense phase of high turbulence in a major portion of the bed of contact material. The upper limit of this zone may be maintained for example at a level such as indicated by the broken line 27 in Fig. 2, by controlling the quantity of fluid reactants passing through the distribution nozzles 22. The contact material may also be introduced in regulated quantities and in heated state in order to assist in controlling the temperature in the reaction zone. When desired and preferably the outer surfaces of the reactor and distribution chamber and cones may be covered with suitable heat insulating materials, not shown, to reduce heat losses due to radiation.

In order to accommodate differential expansion and contraction between the reactor shell and the heat exchangers due to their temperature difference suitable expansion joints 32 may be incorporated in the cooler shells 12. Also suitable supporting lugs 33 and 34 may be attached at spaced intervals, by welding or other suitable means, to the outer peripheries of the heat exchanger shells 12 and shell 1, respectively, and preferably the heat exchangers and the reactor shell are individually supported from these lugs.

In order to demonstrate the utility of the invention, its operation when employed in the process for the dehydrogenation of butane to butadiene will hereinafter be described. Suitable powdered catalyst such as an oxide of chromium, vanadium or molybdenum on supports comprising alumina or magnesia is introduced by means of conduit 21 into the distributing chamber 20. These catalyst particles are preferably in a heated condition in order to supply a regulated quantity of the heat necessary for conducting the endothermic reaction. Heated butane is introduced through conduit 25, manifold 24 and the communicating conduits 23 to the nozzles 22. The upward velocity of the fluid passing from the nozzle 22 is of such magnitude that it will carry some of the catalyst particles previously introduced to the distribution chamber 20 through conduit 21 into the reactor. The velocity of this fluid however only partially offsets the effect of gravity upon the catalyst particles thereby maintaining a relatively dense phase in the lower portion of the catalyst bed due to recirculation therethrough of a large quantity of the catalyst particles. The approximate upper limit of this dense phase is indicated in Fig. 2 by the broken line 27. Above this line the velocity of fluid will have been reduced to such an extent that it will no longer offset the effect of gravity upon the catalyst particles and a small portion thereof will be carried with the reaction products into the heat exchangers. The rapid cooling effected in the heat exchangers will further reduce the velocity of the fluid and aid in the additional separation of solid particles therefrom. After passing through the cooler the reaction products are directed through the several conduits 18 to suitable separation and recovery equipment, which, not being part of the invention, is not shown.

During the conversion of butane to butadiene a deleterious deposit will accumulate on the various catalyst particles and must be removed to restore its activity. I, therefore, provide means for removing the catalyst as it becomes contaminated. This is accomplished by employing the ports 9 in the tubular reinforcing members 8 through which the contaminated catalyst will be directed out of the reactor to suitable regeneration equipment. Steam or other inert gas may be introduced through conduits 28 and nozzles 29 to conduits 8 to serve as stripping means for preventing reactants or reaction products from accompanying the catalyst to the regenerating zone.

I claim:

1. A reaction vessel of the class described comprising, in combination, a vertically disposed outer shell of tubular form provided with relatively flat top and bottom heads, relatively flat tube sheets transversely disposed in spaced apart relation within said shell and secured thereto, a plurality of vertically disposed tubular members extending between and secured to said tube sheets, some of said tubular members extending between and being secured to said heads and other of said tubular members terminating short of said heads, the shorter tubes being open at their opposite ends, to spaces provided between the shorter tubes and top and bottom heads, whereby to establish communication through the shorter tubes between said spaces, and said tube sheets being provided with openings therethrough between the tubes.

2. A reaction vessel of the class described comprising, in combination, a vertically disposed outer shell of tubular form provided with relatively flat top and bottom heads, relatively flat tube sheets transversely disposed in spaced apart relation within said shell and secured thereto, a plurality of vertically disposed tubular members extending between and secured to said tube sheets, some of said tubular members extending between and being secured to said heads and other of said tubular memers terminating short of said heads, the shorter tubes being open at their opposite ends, to spaces provided between the shorter tubes and top and bottom heads, whereby to establish communication through the shorter tubes between said spaces, and said tube sheets being provided with openings therethrough between the tubes, means for admitting fluid reactants and finely divided solids into the lower portion of said vessel a perforated plate between the last-named means and the lower ends of the shorter tubes and means for removing fluid reaction products from the upper portion of the vessel.

3. A reactior vessel comprising an outer shell having flat top and bottom heads, perforated tube sheets extending horizontally across the shell, said tube sheets being spaced from each other and from said top and bottom heads, spaced open-ended vertical tubes extending between said tube sheets and terminating short of said heads, additional spaced tubes extending between and serving as stays for the top and bottom heads of the shell, the last-named tubes having open ends projecting through the bottom head of the shell and being provided with openings in communication with the space between the top head of the shell and the uppermost of said tube sheets, means for directing fluid and finely divided solids upwardly into the first-mentioned tubes, and means for removing fluid from the upper portion of the shell.

4. A reaction vessel comprising an outer shell having flat top and bottom heads, spaced open-ended tubes disposed vertically within said shell and terminating short of said heads, additional spaced tubes extending between and serving as stays for the top and bottom heads of the shell, the last-named tubes having open ends projecting through the bottom head of the shell and being provided with openings in communication with the space between the top head of the shell and the upper ends of the first-mentioned tubes, means for directing fluid and finely divided solids upwardly into the first-mentioned tubes, and means for removing fluid from the upper portion of the shell.

LEV A. MEKLER.